(12) United States Patent
Minoo

(10) Patent No.: US 11,589,074 B2
(45) Date of Patent: Feb. 21, 2023

(54) COLOR VOLUME TRANSFORMS IN CODING OF HIGH DYNAMIC RANGE AND WIDE COLOR GAMUT SEQUENCES

(71) Applicant: ARRIS Enterprises LLC, Suwanee, GA (US)

(72) Inventor: Koohyar Minoo, San Diego, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 78 days.

(21) Appl. No.: 16/872,677

(22) Filed: May 12, 2020

(65) Prior Publication Data

US 2020/0275126 A1 Aug. 27, 2020

Related U.S. Application Data

(63) Continuation of application No. 15/248,024, filed on Aug. 26, 2016, now Pat. No. 10,687,080.

(Continued)

(51) Int. Cl.
*H04N 19/60* (2014.01)
*H04N 19/105* (2014.01)
(Continued)

(52) U.S. Cl.
CPC ............. *H04N 19/60* (2014.11); *G06T 5/009* (2013.01); *G06T 5/50* (2013.01); *H04N 1/603* (2013.01);
(Continued)

(58) Field of Classification Search
CPC .... H04N 19/60; H04N 19/105; H04N 19/117; H04N 19/124; H04N 19/182;
(Continued)

(56) References Cited

U.S. PATENT DOCUMENTS 9,961,237 B2 * 5/2018 Atkins .................... H04N 9/68
2010/0245380 A1 9/2010 Doser et al.
(Continued)

FOREIGN PATENT DOCUMENTS

KR 10-2009-0122368 A 11/2009
KR 10-2014-0146628 A 12/2014
(Continued)

OTHER PUBLICATIONS

U.S. Appl. No. 15/217,046, filed Jul. 22, 2016.
(Continued)

*Primary Examiner* — Maria E Vazquez Colon
(74) *Attorney, Agent, or Firm* — Chernoff, Vilhauer, McClung & Stenzel, LLP

(57) ABSTRACT

A method of encoding a digital video, comprising receiving a high dynamic range (HDR) master of a video, a reference standard dynamic range (SDR) master of the video, and target SDR display properties at an encoder, finding a color volume transform that converts HDR values from the HDR master into SDR values that, when converted for display on the target SDR display, are substantially similar to SDR values in the reference SDR master, converting HDR values from the HDR master into SDR values using the color volume transform, generating metadata items that identifies the color volume transform to decoders, and encoding the SDR values into a bitstream.

20 Claims, 7 Drawing Sheets

Related U.S. Application Data

(60) Provisional application No. 62/211,519, filed on Aug. 28, 2015.

(51) Int. Cl.

| | | |
|---|---|---|
| *H04N 19/124* | (2014.01) | |
| *H04N 19/186* | (2014.01) | |
| *H04N 19/46* | (2014.01) | |
| *G06T 5/00* | (2006.01) | |
| *H04N 19/85* | (2014.01) | |
| *H04N 19/182* | (2014.01) | |
| *H04N 1/60* | (2006.01) | |
| *G06T 5/50* | (2006.01) | |
| *H04N 19/117* | (2014.01) | |
| *H04N 1/64* | (2006.01) | |
| *H04N 19/17* | (2014.01) | |
| *H04L 45/745* | (2022.01) | |

(52) U.S. Cl.
CPC ............. *H04N 1/64* (2013.01); *H04N 19/105* (2014.11); *H04N 19/117* (2014.11); *H04N 19/124* (2014.11); *H04N 19/182* (2014.11); *H04N 19/186* (2014.11); *H04N 19/46* (2014.11); *H04N 19/85* (2014.11); *G06T 2207/10016* (2013.01); *G06T 2207/10024* (2013.01); *H04L 45/745* (2013.01); *H04N 19/17* (2014.11)

(58) Field of Classification Search
CPC ...... H04N 19/186; H04N 19/85; H04N 19/17; H04N 1/603; H04N 1/64; H04N 19/46; G06T 5/009; G06T 5/50; G06T 2207/10016; G06T 2207/10024; H04L 45/745

See application file for complete search history.

(56) References Cited

U.S. PATENT DOCUMENTS

| | | | | |
|---|---|---|---|---|
| 2014/0029675 | A1* | 1/2014 | Su | G06F 17/18 375/240.16 |
| 2015/0245044 | A1* | 8/2015 | Guo | H04N 19/186 375/240.03 |
| 2016/0344990 | A1* | 11/2016 | Kozuka | H04N 21/43635 |
| 2016/0360212 | A1* | 12/2016 | Dai | H04N 19/186 |
| 2017/0171576 | A1* | 6/2017 | Oh | H04L 67/02 |
| 2018/0007423 | A1* | 1/2018 | Tsukagoshi | H04N 19/70 |
| 2018/0192077 | A1* | 7/2018 | Olivier | H04N 19/70 |
| 2018/0262769 | A1* | 9/2018 | Su | H04N 19/33 |
| 2018/0352257 | A1* | 12/2018 | Leleannec | G06T 5/10 |

FOREIGN PATENT DOCUMENTS

| | | |
|---|---|---|
| WO | 2012/027405 A2 | 3/2012 |
| WO | 2012/142285 A2 | 10/2012 |
| WO | 2013/046095 A2 | 4/2013 |

OTHER PUBLICATIONS

PCT Search Report & Written Opinion, RE: Application No. PCT/US2016/048836, dated Dec. 2, 2016.

D. Baylon, et al., "On single layer HDR coding with SDR backward compatibility", 113th MPEG Meeting, Oct. 19-23, 2015, Geneva (Motion Picture Expert Group or ISO/IEC JTC1/SC29/WG11) No. m37092, Oct. 14, 2015, the whole document.

G. Johnson, et al., "Derivation of a color space for image color difference measurement", Color Research & Application, vol. 35, No. 6, Jan. 7, 2010, pp. 387-400., XP55320673, US ISSN: 0361-2317, D01: 10.1002; col. 20561, pp. 388-389, paragraph "Practical Opponent Color Spaces".

F. Banterle, et al., "High Dynamic Range Imaging and Low Dynamic Range Expansion for Generating HRD Content", Computer Graphics Forum, vol. 28, No. 8. Dec. 1, 2009, pp. 2343-2367, XP055031838, ISSN: 0167-705, D01: 10,1111/j.1467-8659.2009.01541.x the whole document.

"Call for Evidence (CfE) for HDR and WCG Video Coding", 111th MPEG Meeting, Feb. 6-20, 2015, Geneva, (Motion Picture Expert Group or ISO/IEC JTC1/SC29/WG11), No. N15083, Feb. 27, 2015, XP030021809, pp. 4-6, paragraph 4.2.1.1-paragraph 4.2.1.2, figs. 2,4.

D. Baylon, et al., "Response to Call for Evidence for HDR and WCG Video Coding: ARRIS, Dolby and InterDigital", 112th MPEG Meeting, Jun. 22-26, 2015, Warsaw (Motion Picture Expert Group or ISO/IEC JTC1/SC29/WG11), No. m36264, Jun. 23, 2015, XP030064632, pp. 1-2, paragraph 2.1, figure 1.

Technicolor, 'HDR Ecosystem Workflow', IEC/TC100/AGS, Advisory Group on Strategy, May 23, 2019, 6 pgs.

H. Kasliwal et al., 'A Novel Technique for Tone Mapping of HDR Images',TIET Digital Repository, Jun. 2015, 52 pgs.

G.M. Johnson et al. 'Derivation of a Color Space for Image Color Difference Measurement' Derivation of a color space for image color difference measurement—Johnson, Jan. 2010, 15 pgs.

\* cited by examiner

US 11,589,074 B2

COLOR VOLUME TRANSFORMS IN CODING OF HIGH DYNAMIC RANGE AND WIDE COLOR GAMUT SEQUENCES

CLAIM OF PRIORITY

This Application is a continuation of pending U.S. patent application Ser. No. 15/248,024 filed on Aug. 26, 2016, which claims priority under 35 U.S.C. § 119(e) from earlier filed U.S. Provisional Application Ser. No. 62/211,519, filed Aug. 28, 2015, which is hereby incorporated by reference.

TECHNICAL FIELD

The present disclosure relates to the field of video encoding and decoding, particularly a method of converting between color values in an standard dynamic range (SDR) color volume and a high dynamic range (HDR) color volume, such that the same bitstream can be used by SDR systems and HDR systems.

BACKGROUND

Video sequences with color values in a High Dynamic Range (HDR) video and/or Wide Color Gamut (WCG) offer greater ranges of luminance and color values than traditional video with color values in a standard dynamic range (SDR) and/or a narrower color gamut. For example, traditional SDR video can have a limited luminance and color range, such that details in shadows or highlights can be lost when images are captured, encoded, and/or displayed. In contrast, HDR video can capture a broader range of luminance and color information, allowing the video to appear more natural and closer to real life to the human eye.

While HDR video can look more natural than traditional SDR video, many displays and/or decoders do not yet support HDR video. HDR video can have a higher ratio of maximum visible brightness values to minimum visible brightness values than SDR video, but many SDR displays are not capable of reproducing the higher contrast that can be present in HDR video. For example many existing SDR displays can display contrasts at luminance values from 0.5 to 100 nits (candelas per square meter), while many HDR displays can display contrasts at much higher ranges of luminance values, such as luminance values from 0.01 to 1000 nits.

Some systems solve this problem by generating different bitstreams for different types of displays. For example, an SDR bitstream can be generated that can be decoded and displayed on SDR displays, while a separate HDR bitstream can be generated that can be decoded and displayed on HDR displays. However, creating two separate bitstreams for a single video can be time consuming and/or processor intensive. Additionally, servers may need to store both versions of the bitstream so that devices can request the version appropriate for their display capabilities. This can lead to storage capacity issues. Alternately, bitstreams for both versions can be multiplexed into the same transport stream such that decoders can choose which of the two bitstreams to decode from the transport stream. However, this can increase the size of the transport stream and accordingly use more bandwidth to transfer the transport stream.

What is needed is a system for encoding a single bitstream from an HDR source, such that the same bitstream can be decoded by HDR Systems to present HDR color values and by SDR Systems to present SDR color values. In such a system, decoders should be able to use information generated by an encoder to convert values decoded from the bitstream into either an HDR color volume or an SDR color volume as appropriate for their display type.

SUMMARY

The present disclosure provides a method of encoding a digital video, the method comprising receiving a high dynamic range (HDR) master, a reference standard dynamic range (SDR) master, and target SDR display properties at an encoder, wherein the HDR master is a first image essence of a video comprising HDR values in an HDR color volume, the reference SDR master is a second image essence of the video comprising reference SDR values in an SDR color volume, and the target SDR display properties indicate SDR display operations that a target SDR display uses to convert decoded SDR values for display on a screen, finding a color volume transform at the encoder such that the color volume transform converts HDR values originating from the HDR master into SDR values that, when converted with the SDR display operations identified in the target SDR display properties, are substantially similar to the reference SDR values, converting HDR values originating from the HDR master into SDR values using the color volume transform at the encoder, generating one or more metadata items with the encoder that identifies the color volume transform to decoders, and encoding the SDR values into a bitstream with the encoder.

The present disclosure also provides a method of encoding a digital video, the method comprising receiving a high dynamic range (HDR) master and a reference standard dynamic range (SDR) master at an encoder, wherein the HDR master is a first image essence of a video comprising HDR values in an HDR color volume, the reference SDR master is a second image essence of the video comprising reference SDR values in an SDR color volume, finding a color volume transform at the encoder such that the color volume transform converts HDR values originating from the HDR master into SDR values that are substantially similar to the reference SDR values, generating one or more metadata items with the encoder that identifies the color volume transform to decoders, and encoding the HDR values into a bitstream with said encoder.

BRIEF DESCRIPTION OF THE DRAWINGS

Further details of the present invention are explained with the help of the attached drawings in which.

DETAILED DESCRIPTION

Figure 1:
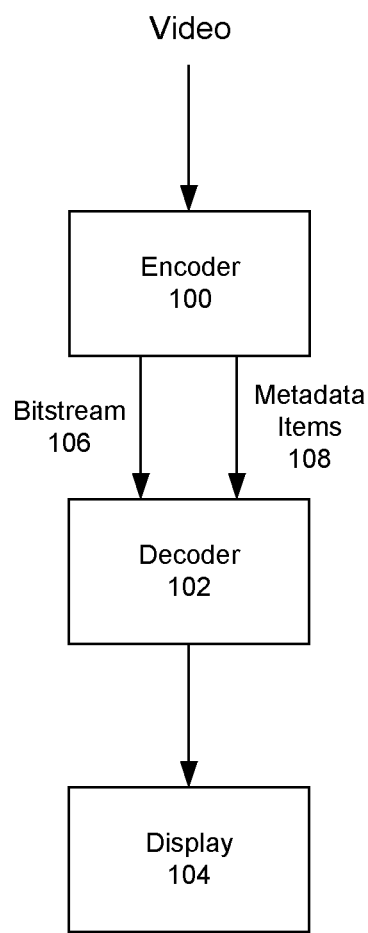
FIG. 1 depicts an exemplary embodiment of a video system comprising an encoder and a decoder coupled with a display.

FIG. 1 depicts an embodiment of a video system comprising an encoder 100 and a decoder 102 coupled with a display 104. The encoder 100 can generate a bitstream 106 and metadata items 108 from elements of a video, including its image essence. A video's image essence can be an ordered sequence of images, such as a sequence of frames or pictures. The bitstream 106 and metadata items 108 generated by the encoder 100 can be provided to a decoder 102 over the internet, over a digital cable television connection such as Quadrature Amplitude Modulation (QAM), or over any other digital transmission or delivery mechanism. A decoder 102 can use the bitstream 106 and metadata items 108 to decode and output a reconstructed version of the video for playback on the display 104. The display 104 can be a television, monitor, device screen, or any other type of display configured to present reconstructed video.

An encoder 100 can comprise processors, memory, circuits, and/or other hardware and software elements configured to encode, transcode, and/or compress elements of a video, such as its image essence, into a bitstream 106. The encoder 100 can be configured to generate the bitstream 106 according to a video coding format and/or compression scheme, such as HEVC (High Efficiency Video Coding), H.264/MPEG-4 AVC (Advanced Video Coding), or MPEG-2. By way of a non-limiting example, in some embodiments the encoder 100 can be a Main 10 HEVC encoder.

Similarly, a decoder 102 can comprise processors, memory, circuits, and/or other hardware and software elements configured to decode, transcode, and/or decompress a bitstream 106 into a reconstructed video. A decoder 102 can be configured to decode a bitstream 106 according to a video coding format and/or compression scheme, such as HEVC, H.264/MPEG-4 AVC, or MPEG-2. By way of a non-limiting example, in some embodiments a decoder 102 can be a Main 10 HEVC decoder.

In some embodiments, the encoder 100 and/or decoder 102 can be dedicated hardware devices. In other embodiments the encoder 100 and/or decoder 102 can be, or use, software programs running on other hardware such as servers, computers, or video processing devices. By way of a non-limiting example, an encoder 100 can be a video encoder operated by a video service provider, while a decoder 102 can be part of a set top box, such as a cable box, connected to a television or other display 104. In some embodiments, a decoder 102 and display 104 can be integrated into a single device.

A decoder 102 and/or a display 104 can be a Standard Dynamic Range (SDR) System or a High Dynamic Range (HDR) System. An HDR System can decode and display luminance values in a High Dynamic Range (HDR) and/or chromaticity values in a Wide Color Gamut (WCG), while an SDR System can be limited to decoding and/or displaying luminance and/or chromaticity values in smaller ranges. By way of a non-limiting example, HDR video can have a higher ratio of maximum visible brightness to minimum visible brightness compared to SDR video. As such, HDR Systems can reproduce HDR video with a larger range of colors and details, such as perceptible shadow and highlight detail, than SDR video reproducible by SDR Systems.

While an HDR display 104 can generally process conventional SDR video with built in support for operations such as SDR transfer functions to convert the SDR video for presentation on the display 104, many SDR displays 104 do not support transfer functions and/or color space and color primaries used to display HDR video. By way of a non-limiting example, in some embodiments an SDR display 104 can be configured to reproduce luminance values up to 100 nits (candelas per square meter) as defined by Recommendation ITU-R BT.2035 Section 3.2, while in some embodiments an HDR display 104 can reproduce luminance values up to 1000 nits or greater. By way of another non-limiting example, in some embodiments an SDR display 104 can reproduce chromaticity values in a standard color gamut defined by Recommendation ITU-R BT.709, while in some embodiments an HDR display 104 can reproduce chromaticity values in a wide color gamut defined by Recommendation ITU-R BT.2020. Recommendation ITU-R BT.2035, Recommendation ITU-R BT.709, and Recommendation ITU-R BT.2020 are hereby incorporated by reference.

Figure 2:
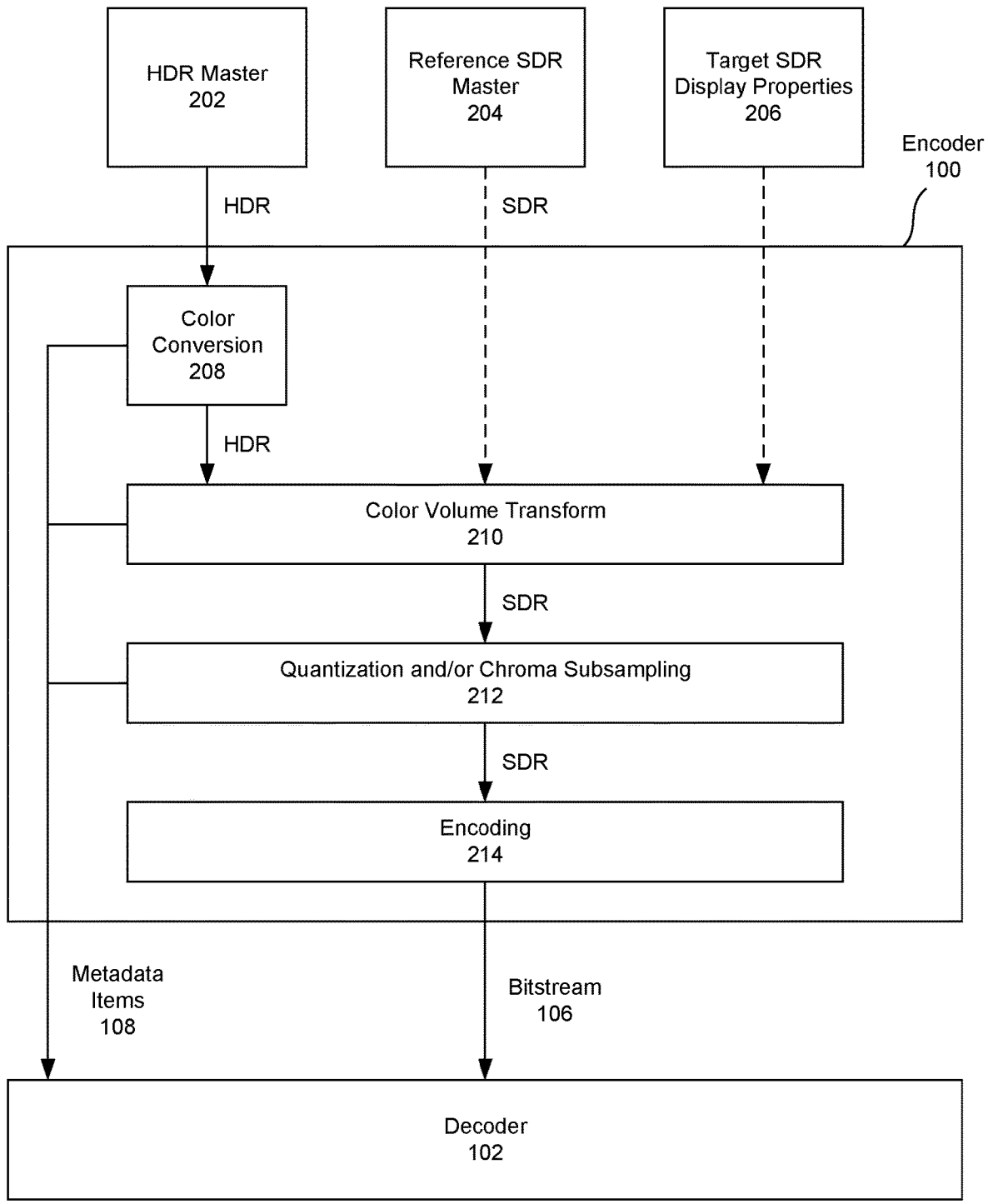
FIG. 2 depicts an embodiment of an encoder configured to generate a bitstream with encoded SDR values from an HDR Master.
Figure 3:
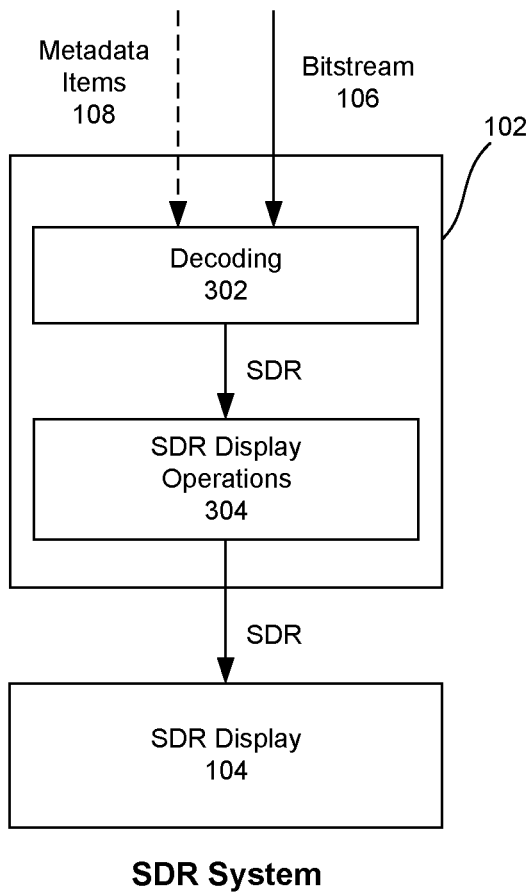
FIG. 3 depicts an embodiment a decoder in an SDR System configured to decode and display SDR values from the bitstream produced by the encoder shown in FIG. 2.
Figure 4:
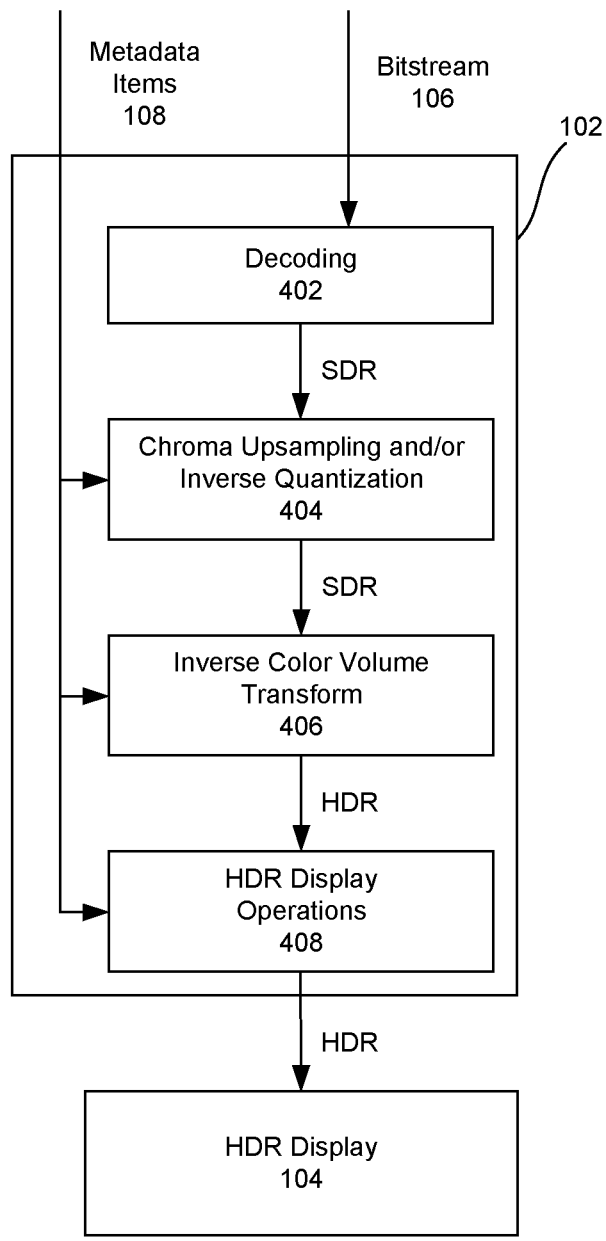
FIG. 4 depicts an embodiment a decoder in an HDR System configured to decode SDR values from the bitstream produced by the encoder shown in FIG. 2, and to convert the SDR values into HDR values for display.

FIGS. 2-4 depict an embodiment of system in which an encoder 100 can generate a bitstream 106 from HDR values such that the bitstream 106 can be decoded by both HDR Systems and SDR Systems depending on their display properties. As shown in FIG. 2, in this embodiment the encoder 100 can output a bitstream 106 that comprises encoded versions of SDR luminance and/or chromaticity values, and one or more metadata items 108 can indicate how the encoder 100 generated SDR values from the original HDR values. As such, an SDR System can reconstruct an SDR video from the bitstream 106 for playback as shown in FIG. 3, while an HDR System can decode the bitstream 106 and use an operation identified in one or more metadata items 108 to convert decoded SDR values into HDR values for playback on an HDR display 104 as shown in FIG. 4.

While FIGS. 3 and 4 depict separate decoders 102 for SDR Systems and HDR Systems, in alternate embodiments a decoder 102 can be configured with operations for both SDR Systems and HDR Systems, such that the same decoder 102 can follow the operations shown in FIG. 3 if it is outputting video to an SDR display 104 or the operations shown in FIG. 4 if it is outputting video to an HDR display 104.

As shown in FIG. 2, an encoder 100 can receive both an HDR Master 202 and a Reference SDR Master 204 of the same video. The encoder 100 can also receive or be configured with Target SDR Display Properties 206 that describe attributes of a targeted type of SDR display 104, as will be described further below.

The HDR Master 202 can be an image essence of the video in which luminance and/or chromaticity values are represented in a high dynamic range (HDR) and/or wide color gamut (WCG), as described above. The Reference SDR Master 204 can be an image essence of the same video, in which luminance and/or chromaticity values are represented in a smaller dynamic range and/or narrower color gamut than the HDR Master's values.

In some embodiments the encoder 100 can perform one or more color conversion operations 208 on the HDR values from the HDR Master 202. Color conversion operations 208 can be color primary conversions, color space conversions, and/or transfer function operations. Color primary conversion operations can convert values into a different color primary, such as converting between values in the RGB, LMS, and/or XYZ color primaries. Color space conversion operations can convert values into a different color space, such as converting between the RGB, IPT, and/or YCbCr color spaces. Transfer function operations can be non-linear transfer functions that can redistribute values into a different range, such as more uniformly distributing values that are bunched together within a particular value range.

By way of a non-limiting example, in some embodiments when input values in the HDR Master 202 are linear RGB values, the encoder 100 can perform a color primary conversion to convert the RGB values with certain primary values to a different primary set, use a transfer function to redistribute the values non-linearly to make color perception more uniform, perform a color space conversion to convert the non-linear values into YCbCr values, and/or use a second transfer function to make color contrast more uniform. As such, in this example the color conversion operations 208 can convert the original linear HDR RGB values from the HDR Master 202 into non-linear HDR YCbCr values, which can be passed to the color volume transform operation 210 discussed below. In alternate embodiments some or all of the color conversion operations 208 can be skipped, such that original values from the HDR Master 202 can be left alone or are converted in any other desired way before they are passed to the color volume transform operation 210.

The color volume transform operation 210 can be a tone mapping function, scaling factor, a set of one or more lookup tables, or any other operation or data that can be used to convert color values from an HDR color volume to a smaller SDR color volume. By way of a non-limiting example, the color volume transform operation 210 can convert HDR YCbCr color values to SDR YCbCr color values.

As will be described further below, the encoder 100 can use the Reference SDR Master 204 and the Target SDR Display Properties 206 to find a color volume transform operation 210 that converts HDR values originating from the HDR Master 202 into SDR values that will substantially match the SDR values in the Reference SDR Master 204 when they are converted for presentation on an SDR display 104. The Target SDR Display Properties 206 can indicate parameters or other attributes of SDR display operations 304 used by a target display 104 to convert color values for presentation on the display 104. As such, the encoder 100 can emulate those SDR display operations 304 when finding a color volume transform operation 210 that will convert HDR values into SDR values that, when converted for display, will substantially match the SDR values in the Reference SDR Master 204. SDR display operations 304 can include color space conversion operations, transfer functions used to convert values for presentation on a display 104, and/or any other operations. By way of a non-limiting example, the Target SDR Display Properties 206 can comprise parameters of a reference electro-optical transfer function defined in Recommendation ITU-R BT.1886, such as a parameter for a user gain variable and a parameter for a user black level variable. Recommendation ITU-R BT.1886 is hereby incorporated by reference.

At 212, the encoder 100 can perform one or more quantization operations and/or chroma subsampling operations on the SDR values output by the color volume transform operation 210. In some embodiments, the original HDR values in the HDR Master 202 can be provided in a higher bit-depth than expected by an SDR system. By way of a non-limiting example, HDR values can be provided as 16-bit values, while SDR systems can expect 10-bit or 8-bit values. As such, when the color volume transform operation 210 converts high bit-depth HDR values into high bit-depth SDR values, the encoder 100 can quantize the high bit-depth values into lower bit-depth values, such as 10-bit or 8-bit values. Converted SDR values produced by the color volume transform operation 210 can also have more chromaticity information than can be expected by many SDR systems. By way of a non-limiting example, converted SDR YCbCr values can have a 4:4:4 resolution in which the Y luma component, the Cb chroma component, and the Cr chroma component are described with the same number of samples. The encoder 100 can perform a chroma subsampling operation to convert 4:4:4 values to 4:2:0 values that decrease the number of samples devoted to the Cb and Cr chroma components, as the human eye is generally less sensitive to those components than to the Y luma component.

In some embodiments, some of the color conversion operations 208, color volume transform operation 210, quantization operations 212, and/or chroma subsampling operations 212 can be performed in different order than presented in FIG. 2. By way of a non-limiting example, in alternate embodiments the encoder 100 can perform a color primary conversion, a first transfer function, a color space conversion, a chroma subsampling operation, and a second transfer function on HDR values, use a color volume transform operation 210 to convert the HDR values to SDR values, and then perform a quantization operation 212 on the SDR values before encoding them.

At 214, the encoder 100 can encode the SDR values into a bitstream 106. As described above, the encoder 100 can be configured to generate the bitstream 106 according to a video coding format and/or compression scheme, such as HEVC, AVC, or MPEG-2.

The output bitstream 106 can be delivered to decoders 102 along with one or more metadata items 108. Metadata items 108 can indicate information about how the encoder 100 performed color conversion operations 208, the color volume transform operation 210, and/or quantization and chroma subsampling operations 212, such that a decoder 102 for an HDR System can reverse those operations while decoding the bitstream 106 as shown below in FIG. 4. In some embodiments metadata items 108 can be encoded into or otherwise included with the bitstream 106, while in other embodiments the metadata items 108 and bitstream 106 can be separately delivered to decoders 102.

One or more metadata items 108 can be data that identifies or signals to decoder 102 how color volume transform operations 210 were performed and/or identifies or indicates how the decoder 102 can derive an inverse color volume transform operation 406 that can convert decoded SDR values into HDR values. In some embodiments, a metadata item 108 describing a color volume transform operation 210 or inverse color volume transform operation 406 can be a parameter than can adjust a predefined parametric tone mapping function known to the encoder 100 and/or decoder 102 that converts values between an SDR color volume and HDR color volume. In other embodiments, a metadata item 108 can be a value for a scaling factor by which SDR values can be scaled into HDR values or vice versa. In still other embodiments metadata items 108 can be one or more lookup tables. By way of a non-limiting example, a metadata item 108 can be a three dimensional lookup table (3D-LUT) that converts a ternary set of values, such as Y, Cb, and Cr values, from an SDR color volume to an HDR color volume or vice versa. By way of another non-limiting example, metadata items 108 can be a set of three one dimensional lookup tables (1D-LUTs) that each converts a single type of value between an SDR color volume to an HDR color volume, such as a 1D-LUT for Y values, a 1D-LUT for Cb values, and a 1D-LUT for Cr values.

FIG. 3 depicts a decoder 102 in an SDR System decoding the bitstream 106. A decoder 102 for an SDR System can receive the bitstream 106 and decode the bitstream 106 at 302 to find SDR values. In some embodiments the decoder 102 can also receive metadata items 108, but it may ignore metadata items 108 related to how the encoder 100 converted HDR values into SDR values.

The decoder 102 and/or display 104 can also perform one or more SDR display operations 304 on the decoded SDR values to convert them for presentation on the display 104. By way of a non-limiting example, an SDR display operation 304 can be the reference electro-optical transfer function defined in ITU Recommendation BT.1886.

Additionally, when the decoded SDR values are in a different color space than can be presented by the SDR display 104, SDR display operations 304 performed by the decoder 102 or display 104 can be SDR display color space conversion operations that convert the SDR values into the desired color space. By way of a non-limiting example, when decoded values are SDR YCbCr values and the SDR display 104 is configured to present SDR RGB values, the decoder 102 can use SDR display color space conversion operations to convert the SDR YCbCr values into SDR RGB values that can be displayed by the SDR display 104.

In some embodiments, the SDR display color space conversion operations can be a set of functions that operate on SDR YCbCr values, with a first function converting SDR YCbCr values into a red component of display SDR RGB values, a second function converting SDR YCbCr values into a blue component of display SDR RGB values, and a third function converting SDR YCbCr values into a green component of display SDR RGB values. By way of a non-limiting example, the functions can be stated as:

$$F_{R_S}\left(\begin{bmatrix} Y_S \\ Cb_S \\ Cr_S \end{bmatrix}\right) = R_{DS}$$

$$F_{G_S}\left(\begin{bmatrix} Y_S \\ Cb_S \\ Cr_S \end{bmatrix}\right) = G_{DS}$$

$$F_{B_S}\left(\begin{bmatrix} Y_S \\ Cb_S \\ Cr_S \end{bmatrix}\right) = B_{DS}$$

In the above formulas: $Y_S$, $Cb_S$, and $Cr_S$ can be components of SDR YCbCr values; $F_{R_S}$ can be a function that operates on SDR YCbCr values to produce a red value $R_{DS}$ for SDR RGB values that can be displayed by an SDR display 104; $F_{G_S}$ can be a function that operates on SDR YCbCr values to produce a green value $G_{DS}$ for SDR RGB values that can be displayed by an SDR display 104; and $F_{B_S}$ can be a function that operates on SDR YCbCr values to produce a blue value $B_{DS}$ for SDR RGB values that can be displayed by an SDR display 104.

Once the decoded SDR values are in the color space used by the SDR display 104, the SDR display 104 can present a reconstruction of the video's image essence using the SDR values.

FIG. 4 depicts a decoder 102 in an HDR System decoding the bitstream 106. A decoder 102 for an HDR System can receive the bitstream 106 and metadata items 108. At 402, the decoder 102 can decode the bitstream 106 to find SDR values. The decoder 102 can use metadata items 108 that indicate how the encoder 100 converted HDR values into SDR values to reverse the encoder's operations and reconstruct HDR values from the decoded SDR values.

If the encoder 100 performed quantization and/or chroma subsampling operations 212 after a color volume transform operation 210, the decoder 102 can perform inverse quantization and/or chroma upsampling operations 404 that convert the decoded SDR values into a higher bit-depth and/or increase the number of bits devoted to the chroma components.

The decoder 102 can perform an inverse color volume transform operation 406 to convert the decoded values from an SDR color volume to an HDR color volume. By way of a non-limiting example, the inverse color volume transform operation 406 can convert decoded SDR YCbCr color values to HDR YCbCr color values.

As described above, metadata items 108 can indicate how the encoder 100 converted HDR values to SDR values during its color volume transform operation 210, and/or how the decoder 102 can reverse the color volume transform operation 210 during its inverse color volume transform operation 406. By way of non-limiting examples, the metadata items 108 can be a parameter for a parametric tone mapping function, a scaling factor, a 3D-LUT, or three 1D-LUTs, that can be used to convert decoded SDR values to HDR values.

The decoder 102 and/or display 104 can also perform one or more HDR display operations 408 on the decoded HDR values to convert them for presentation on the display 104. Additionally, when the HDR values are in a different color space than can be presented by the HDR display 104, HDR display operations 408 performed by the decoder 102 or display 104 can be HDR display color space conversion operations that convert the HDR values into the desired color space. By way of a non-limiting example, when the values are HDR YCbCr values and the HDR display 104 is configured to present HDR RGB values, the decoder 102 can use HDR display operations 408 to convert the HDR YCbCr values into HDR RGB values that can be displayed by the HDR display 104.

In some embodiments, the HDR display operations 408 can be a set of functions that operate on HDR YCbCr values, with a first function converting HDR YCbCr values into a red component of display HDR RGB values, a second function converting HDR YCbCr values into a blue component of display HDR RGB values, and a third function converting HDR YCbCr values into a green component of display HDR RGB values. By way of a non-limiting example, the functions can be stated as:

$$F_{R_H}\left(\begin{bmatrix} Y_H \\ Cb_H \\ Cr_H \end{bmatrix}\right) = R_{DH}$$

$$F_{G_H}\left(\begin{bmatrix} Y_H \\ Cb_H \\ Cr_H \end{bmatrix}\right) = G_{DH}$$

$$F_{B_H}\left(\begin{bmatrix} Y_H \\ Cb_H \\ Cr_H \end{bmatrix}\right) = B_{DH}$$

In the above formulas: $Y_H$, $Cb_H$, and $Cr_H$ can be components of HDR YCbCr values; $F_{R_H}$ can be a function that operates on HDR YCbCr values to produce a red value $R_{DH}$ for HDR RGB values that can be displayed by an HDR display 104; $F_{G_H}$ can be a function that operates on HDR YCbCr values to produce a green value $G_{DH}$ for HDR RGB values that can be displayed by an HDR display 104; and $F_{B_H}$ can be a function that operates on HDR YCbCr values to produce a blue value $B_{DH}$ for HDR RGB values that can be displayed by an HDR display 104.

Once the decoded HDR values are in the color space used by the HDR display 104, the HDR display 104 can present a reconstruction of the video's image essence using the HDR values.

As can be seen from FIGS. 2-4, an SDR System and an HDR System can receive the same bitstream 106 and metadata items 108 produced by the encoder 100 from an HDR Master 202 of a video. The bitstream 106 can have encoded versions of SDR values, while the metadata items 108 can indicate how to convert the encoded SDR values to HDR values. As such, the SDR System can process the bitstream 106 to present a reconstruction of the video's image essence using the SDR values, while the HDR System can use operations identified by the metadata items 108 to process the same bitstream 106 and present a reconstruction of the video's image essence using HDR values.

Figure 5:
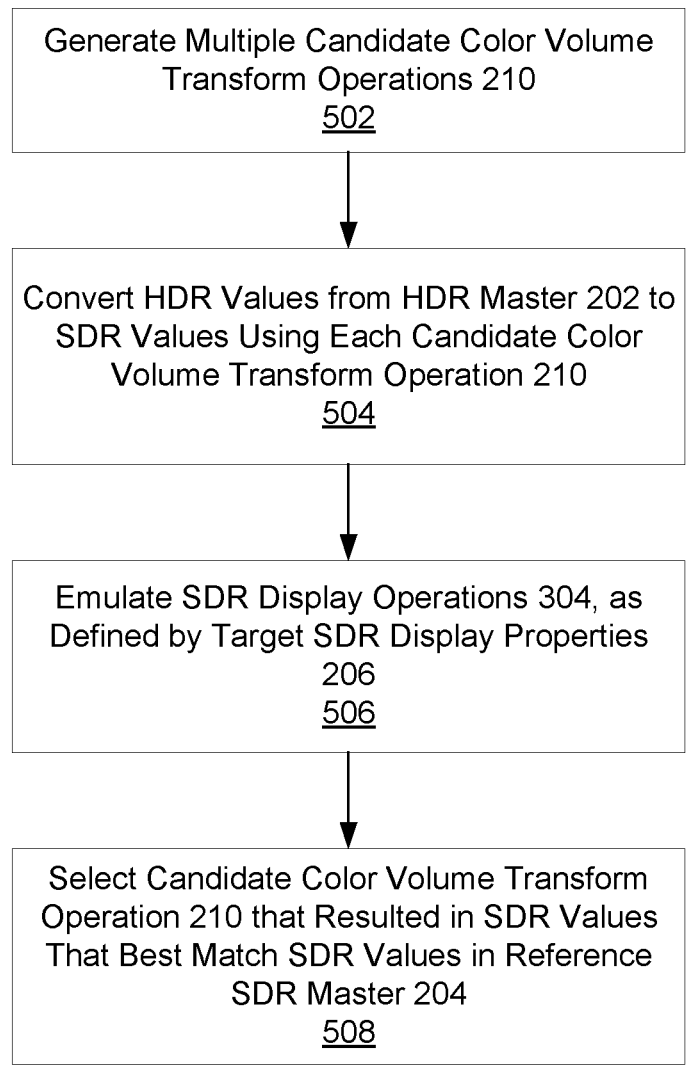
FIG. 5 depicts a process for finding a color volume transform operation at an encoder to convert HDR values from an HDR Master into SDR values based on SDR values of a Reference SDR Master and display properties of a target SDR display.

FIG. 5 depicts a process for finding a color volume transform operation 210 at the encoder 100 shown in FIG. 2. As described above, the encoder 100 can find a color volume transform operation 210 that can convert values in an HDR color volume from the HDR Master 202 into values in an SDR color volume that, when converted for presentation on an SDR display 104, will substantially match SDR values from the Reference SDR Master 204.

At step 502, the encoder 100 can vary parameters or other attributes of a default color volume transform operation 210 generate a plurality of candidate color volume transform operations 210.

At step 504, the encoder 100 can convert HDR values from the HDR Master 202 into SDR values using each of the candidate color volume transform operations 210. By way of a non-limiting example, the encoder 100 can convert HDR YCbCr values into different candidate SDR YCbCr values using each of the candidate color volume transform operations 210.

At step 506, the encoder 100 can emulate SDR display operations 304 used by a target SDR System to convert the candidate SDR values produced by each candidate color volume transform operation 210 into candidate presentation SDR values in a different color space that would be presented by the target SDR display 104. In some embodiments, the Target SDR Display Properties 206 described above can indicate parameters or other attributes of the SDR display operations 304 used by a target SDR System, such that the encoder 100 can emulate those SDR display operations 304. By way of a non-limiting example, when each candidate color volume transform operation 210 produced different candidate SDR YCbCr values, the encoder 100 can emulate SDR color space conversion operations and display transfer functions to convert the candidate SDR YCbCr values to candidate presentation SDR RGB values that could be displayed by the target SDR display 104.

At step 508, the encoder 100 can compare the difference between the SDR values in the Reference SDR Master 204 and the candidate presentation SDR values produced by the emulated SDR display operations 304. The encoder 100 can select the candidate color volume transform operation 210 that led to candidate presentation SDR values that had the smallest difference with the SDR values in the Reference SDR Master 204 as a final color volume transform operation 210 to use in FIG. 2. By way of a non-limiting example, when the emulated SDR display operations 304 produced different candidate presentation SDR RGB values, the encoder 100 can select the final color volume transform operation 210 as the one that led to the candidate presentation SDR RGB values that most closely matched SDR RGB values from the Reference SDR Master 204.

In alternate embodiments the encoder 100 can find a color volume transform operation 210 or the parameters of a parameterized color volume transform operation 210 using one or more predefined formulas that have been derived to minimize the overall distortion, based on the Reference SDR Master 204 and Target SDR Display Properties 206. As described above, the color volume transform operation 210 found by the encoder 100 can convert values in an HDR color volume from the HDR Master 202 into values in an SDR color volume that, when converted for presentation on an SDR display 104, will substantially match SDR values from the Reference SDR Master 204.

By way of a non-limiting example, the encoder 100 can receive captured sample values from the HDR Master 202 as HDR RBG values, denoted as $R_{CH}$, $G_{CH}$, and $B_{CH}$. It can perform one or more color conversion operations 208 to convert the HDR RBG values into HDR YCbCr values, denoted as $Y_H$, $Cb_H$, and $Cr_H$. The encoder 100 can then find a color volume transform operation 210 denoted as $\mathcal{H}$ that converts the HDR YCbCr values into SDR YCbCr values, denoted as $Y_S$, $Cb_S$, and $Cr_S$. The encoder 100 can find a color volume transform operation 210 that produces SDR YCbCr values such that when the SDR YCbCr values are converted into display SDR RGB values (denoted as $R_{DS}$, $G_{DS}$, and $B_{DS}$) using emulated SDR display operations 304, the differences between the emulated display SDR RGB values and reference SDR RGB values from the Reference SDR Master 204 (denoted as $R_{RS}$, $G_{RS}$, and $B_{RS}$) are minimized. Restated, when a distance function D, such as function for finding a Euclidean 2-norm distance or any other distance measure, find the distance between two sets of SDR RGB values, the encoder 100 can find a color volume transform operation $\mathcal{H}$, such that:

$$\mathcal{H}\left(\begin{bmatrix} Y_H \\ Cb_H \\ Cr_H \end{bmatrix}\right) = \begin{bmatrix} Y_S \\ Cb_S \\ Cr_S \end{bmatrix}, \text{ s.t. } \min\left\{D\left(\begin{bmatrix} R_{RS} \\ G_{RS} \\ B_{RS} \end{bmatrix}, \begin{bmatrix} R_{DS} \\ G_{DS} \\ B_{DS} \end{bmatrix}\right)\right\}$$

When the encoder 100 finds and uses a particular color volume transform operation 210, $\mathcal{H}$, it can also find a corresponding inverse color volume transform operation 406, denoted as $H^{-1}$, that would reverse the effects of H and convert the SDR YCbCr values denoted as $Y_S$, $Cb_S$, and $Cr_S$ into the HDR YCbCr values denoted as $Y_H$, $Cb_H$, and $Cr_H$.

The encoder 100 can generate one or more metadata items 108 that communicates a representation of the inverse color volume transform operation 406, as $H^{-1}$, to decoders 102 in HDR Systems. In some embodiments H and/or $H^{-1}$ can be defined and communicated by parameters of an invertible parametric function that operates to convert a ternary set of values from one color volume to another color volume. In other embodiments H and/or $H^{-1}$ can be defined and communicated with a reversible three dimensional lookup table (3D-LUT) that converts a ternary set of values from one color volume to another color volume. In still other embodiments H and/or $H^{-1}$ can be defined and communicated with a set of three reversible one dimensional lookup tables (1D-LUT), each of which converts one of a ternary set of values from one color volume to another color volume. As such, metadata items 108 sent to decoders 102 to identify an inverse color volume transform operation 406, $H^{-1}$, can be parameters of an invertible parametric function, a 3D-LUT, or three 1D-LUTs. By way of a non-limiting example, a decoder 102 can be preloaded with a parameterized inverse color volume transform operation 406 that it can adjust based on parameters received in metadata items 108 for a particular bitstream 106.

In some embodiments or situations in which the HDR Master 202 and Reference SDR Master 204 both provide their initial values in the same color primary, or when the values can be converted into the same color primary, the encoder 100 can find a color volume transform operation 210 based on the distance D between candidate display SDR RGB values $R_{DS}$, $G_{DS}$, and $B_{DS}$ and linearly scaled versions of HDR RGB values that would be displayed by a target HDR display 104. In these embodiments, the encoder 100 can emulate HDR color space conversion operations that would be performed by an HDR System to convert HDR YCbCr values $Y_H$, $Cb_H$, and $Cr_H$ into HDR RGB values $R_{DH}$, $G_{DH}$, and $B_{DH}$ that could be displayed on a target HDR display 104. The encoder 100 can find or be pre-configured with a scaling factor, denoted as a, by which it can linearly scale the emulated display HDR RGB values. In some embodiments or situations the value of the scaling factor α can be different for every pixel or sub-set of pixels. The encoder 100 can then find a color volume transform operation 210, $\mathcal{H}$, that minimizes the differences between the linearly scaled display HDR RGB values and candidate display SDR RGB $R_{DS}$, $G_{DS}$, and $B_{DS}$ that are found as described above. Restated, the encoder 100 can find a color volume transform operation $\mathcal{H}$, such that:

$$\mathcal{H}\left(\begin{bmatrix} Y_H \\ Cb_H \\ Cr_H \end{bmatrix}\right) = \begin{bmatrix} Y_S \\ Cb_S \\ Cr_S \end{bmatrix}, \text{s.t. } \min\left\{D\left(\alpha \cdot \begin{bmatrix} R_{DH} \\ G_{DH} \\ B_{DH} \end{bmatrix}, \begin{bmatrix} R_{DS} \\ G_{DS} \\ B_{DS} \end{bmatrix}\right)\right\}$$

In these embodiments, the values of the scaling factor α can be included as a metadata item 108 communicated to decoders 102. By way of a non-limiting example, values of the scaling factor α can be provided as a layer in a multilayer coding scheme. In some embodiments, when the value of the scaling factor α is different for different pixels or sub-sets of pixels, the scaling factors α can be provided as two-dimensional maps in metadata items 108. In some embodiments, the decoder 102 can use provided value for the scaling factor to derive an inverse color volume transform operations $\mathcal{H}^{-1}$. In other embodiments, scaling factor values can be parameters from which a decoder 102 can adjust a known inverse color volume transform operation $\mathcal{H}^{-1}$.

In the examples above, the encoder 100 finds a color volume transform operation 210 based on the minimum distance between two sets of RGB values. In alternate embodiments or situations, the encoder 100 can find a color volume transform operation 210 based on a scaling factor α that scales emulated display HDR RGB values or original HDR RGB values from the HDR Master 202 into SDR RGB values that when converted into an SDR Y luma component minimizes the distance between that SDR Y luma component and an SDR Y luma component generated by the color volume transform operation 210. When the scaling factor α is found, it can be used to also find SDR Cb and Cr chroma components from the emulated display HDR RGB values or original HDR RGB values from the HDR Master 202.

In these embodiments, the encoder 100 can also be provided with a function that converts candidate display SDR RGB values into an SDR Y luma component $Y_S$, such as:

$$F_{Y_S}\left(\begin{bmatrix} R_{DS} \\ G_{DS} \\ B_{DS} \end{bmatrix}\right) = Y_S$$

The display HDR RGB values $R_{DH}$, $G_{DH}$, and $B_{DH}$ can be linearly scaled such that they are in the SDR color volume. As such, the encoder 100 can use this function on scaled display HDR RGB values $R_{DH}$, $G_{DH}$, and $B_{DH}$ produced by different values of the scaling factor α to find a value of the scaling factor α that provides the minimum distance D between Y luma components of the SDR YCbCr values and the linearly scaled display HDR YCbCr values. Restated, the encoder 100 can find a scaling factor α as follows:

$$\alpha, \text{s.t. } \min\left\{D\left(Y_S, F_{Y_S}\left(\alpha \cdot \begin{bmatrix} R_{DH} \\ G_{DH} \\ B_{DH} \end{bmatrix}\right)\right)\right\}$$

As the display HDR RGB values $R_{DH}$, $G_{DH}$, and $B_{DH}$ produced by the encoder 100 through emulated HDR display operations 408 can in many situations be assumed to be substantially similar to the original captured sample HDR RBG values $R_{CH}$, $G_{CH}$, and $B_{CH}$ from the HDR Master 202, in some embodiments the encoder 100 can directly use the original captured sample HDR RBG values when finding a scaling factor α, instead of first finding display HDR RGB values $R_{DH}$, $G_{DH}$, and $B_{DH}$. By way of a non-limiting example, in some embodiments the encoder 100 can find scaling factor α as follows:

$$\alpha, \text{s.t. } \min\left\|Y_S - F_{Y_S}\left(\alpha \cdot \begin{bmatrix} R_{CH} \\ G_{CH} \\ B_{CH} \end{bmatrix}\right)\right\|^2$$

Once a scaling factor α has been found as described above based on the relationship between the SDR Y luma component $Y_S$ and original captured HDR RGB values from the HDR Master 202 ($R_{CH}$, $G_{CH}$, and $B_{CH}$) or emulated display HDR RGB values ($R_{DH}$, $G_{DH}$, and $B_{DH}$), the encoder 100 can also use that scaling factor α to generate SDR Cb and Cr chroma components $Cb_S$ and $Cr_S$. By way of a non-limiting example, when the display HDR RGB values are expected to be substantially similar to the original captured HDR RGB values, the encoder 100 can convert the original captured HDR RGB values $R_{CH}$, $G_{CH}$, and $B_{CH}$ into SDR Cb and Cr chroma components using a known scaling factor α, as follows:

$$F_{Cb_s}\left(\alpha \cdot \begin{bmatrix} R_{CH} \\ G_{CH} \\ B_{CH} \end{bmatrix}\right) = Cb_s$$

$$F_{Cr_s}\left(\alpha \cdot \begin{bmatrix} R_{CH} \\ G_{CH} \\ B_{CH} \end{bmatrix}\right) = Cr_s$$

In some embodiments, an HDR display operation 408 can involve performing an SDR display color space conversion operation and then applying a scaling factor α to convert display SDR RGB values into HDR YCbCr values that can then be converted to HDR RGB values for display. As described above, in some embodiments when the encoder 100 determines a value for the scaling factor α, it can include it in a metadata item 108 such that it can be communicated to a decoder 102. However, in other embodiments a decoder 102 in an HDR System can derive a value for the scaling factor α based on decoded values.

By way of a non-limiting example, as shown in FIG. 4 a decoder in an HDR System can decode the bitstream 106 into SDR YCbCr values, including a decoded SDR Y luma component denoted as $\hat{Y}_S$ that can be mapped to an HDR Y luma component denoted as $\hat{Y}_H$. The decoder 102 at an HDR System can also perform SDR display operations 304 to convert the decoded SDR YCbCr values into decoded display SDR RGB values (denoted as $\hat{R}_{DS}$, $\hat{G}_{DS}$, $\hat{B}_{DS}$) that would be displayed on an SDR display 104. From these decoded display SDR RGB values and the decoded SDR Y luma component, the decoder 102 can calculate a value for the scaling factor α as follows:

$$\alpha, \text{ s.t. } \min \left\| \hat{Y}_H - F_{Y_H}\left(\frac{1}{\alpha} \cdot \begin{bmatrix} \hat{R}_{DS} \\ \hat{G}_{DS} \\ \hat{B}_{DS} \end{bmatrix}\right) \right\|^2$$

The decoder 102 can be provided with the relationship between the SDR luma component $\hat{Y}_S$ and an HDR luma component $\hat{Y}_H$. By way of a non-limiting example, a parameter describing an invertible parametric function that relates SDR values to HDR values, or a 1D LUT that maps $\hat{Y}_S$ to $\hat{Y}_H$ can have been provided in a metadata item 108 by the encoder 100. As such, the decoder 102 can find the HDR luma component $\hat{Y}_H$ from the decoded SDR luma component $\hat{Y}_S$, and when the scaling factor α is given to or found by the decoder 102, the decoder 102 can also find decoded HDR Cb and Cr chroma components ($\widehat{Cb}_H$ and $\widehat{Cr}_H$) from the decoded display SDR RGB values as follows:

$$F_{Cb_H}\left(\frac{1}{\alpha} \cdot \begin{bmatrix} \hat{R}_{DS} \\ \hat{G}_{DS} \\ \hat{B}_{DS} \end{bmatrix}\right) = \widehat{Cb}_H$$

$$F_{Cr_H}\left(\frac{1}{\alpha} \cdot \begin{bmatrix} \hat{R}_{DS} \\ \hat{G}_{DS} \\ \hat{B}_{DS} \end{bmatrix}\right) = \widehat{Cr}_H$$

Once the decoder 102 has found decoded HDR YCbCr values from decoded SDR RGB values as described above, the decoder 102 or HDR display 104 can perform an HDR display operation 408 to convert the decoded HDR YCbCr values into HDR RGB values that can be displayed on the HDR display 104.

In the above examples, encoders 100 and/or decoders 102 can be preloaded with some or all of the functions described above that convert RGB values into Y, Cb, or Cr values, including:

$$Y_H = F_{Y_H}\left(\begin{bmatrix} R_{CH} \\ G_{CH} \\ B_{CH} \end{bmatrix}\right), Cb_H = F_{Cb_H}\left(\begin{bmatrix} R_{CH} \\ G_{CH} \\ B_{CH} \end{bmatrix}\right), Cr_H = F_{Cr_H}\left(\begin{bmatrix} R_{CH} \\ G_{CH} \\ B_{CH} \end{bmatrix}\right), \text{ and}$$

$$Y_S = F_{Y_S}\left(\begin{bmatrix} R_{DS} \\ G_{DS} \\ B_{DS} \end{bmatrix}\right), Cb_S = F_{Cb_S}\left(\begin{bmatrix} R_{DS} \\ G_{DS} \\ B_{DS} \end{bmatrix}\right), Cr_S = F_{Cr_S}\left(\begin{bmatrix} R_{DS} \\ G_{DS} \\ B_{DS} \end{bmatrix}\right)$$

In some embodiments, $F_{Y_S}$, $F_{Cb_S}$, and $F_{Cr_S}$ can be set to handle conversion of RGB values larger than a normalized range in the SDR color primary, such as values that are larger than 1 and smaller than 0, as the HDR color volume can be larger than the SDR color volume. Similarly, in some embodiments, $F_{Y_H}$, $F_{Cb_H}$, and $F_{Cr_H}$ can also be set to handle conversion of values outside a normalized range. In embodiments or situations in which SDR and HDR RGB values are not initially in the same color primary and if $F_{Y_S}$, $F_{Cb_S}$, $F_{Cr_S}$, $F_{Y_H}$, $F_{Cb_H}$, or $F_{Cr_H}$ are not set to handle values outside a normalized range, values in the larger color primary can be converted to the smaller color primary.

In some embodiments or situations, the particular set of color conversion operations 208 performed by the encoder 100 on HDR values from the HDR Master 202 can reduce the minimization problems defined above to component scaling. By way of a non-limiting example, when the encoder's color conversion operations 208 include a transfer function that is a power function where $C'=C^\gamma$, γ being a non-linear power of the transfer function, an HDR Y luma component $Y_H$ and an SDR Y luma component $Y_S$ can be found as follows, where $\alpha_{ij}$ is a coefficient value for a 3×3 color space matrix that operates on component i to generate component j:

$$Y_H = F_{Y_H}\left(\begin{bmatrix} R_{CH} \\ G_{CH} \\ B_{CH} \end{bmatrix}\right) = a_{yr} \cdot R_{CH}^\gamma + a_{yg} \cdot G_{CH}^\gamma + a_{yb} \cdot B_{CH}^\gamma$$

$$Y_S = F_{Y_S}\left(\begin{bmatrix} R_{DS} \\ G_{DS} \\ B_{DS} \end{bmatrix}\right) = a_{yr} \cdot R_{DS}^\gamma + a_{yg} \cdot G_{DS}^\gamma + a_{yb} \cdot B_{DS}^\gamma$$

In this situation, the original captured HDR RGB values from the HDR Master 202 ($R_{CH}$, $G_{CH}$, and $B_{CH}$) and display SDR RGB values ($R_{DS}$, $G_{DS}$, and $B_{DS}$) can have a linear relationship defined by the scaling factor α, as follows:

$$\begin{bmatrix} R_{DS} \\ G_{DS} \\ B_{DS} \end{bmatrix} = \alpha \cdot \begin{bmatrix} R_{CH} \\ G_{CH} \\ B_{CH} \end{bmatrix}$$

As such, the SDR Y luma component $Y_S$ can be found from the HDR Y luma component $Y_H$ by multiplying it by $\alpha^\gamma$, as:

$$Y_S = F_{Y_S}\left(\alpha \cdot \begin{bmatrix} R_{CH} \\ G_{CH} \\ B_{CH} \end{bmatrix}\right) = \alpha^\gamma \cdot (a_{yr} \cdot R_{CH}^\gamma + a_{yg} \cdot G_{CH}^\gamma + a_{yb} \cdot B_{CH}^\gamma) = \alpha^\gamma \cdot Y_H$$

From the above equations, when the encoder 100 has an HDR Y luma component and can find a corresponding SDR Y luma component $Y_S$ using a value of γ used in a power function within a color conversion operation 208 from emulated display SDR RGB values ($R_{DS}$, $G_{DS}$, and $B_{DS}$), the encoder 100 can find a scaling factor α using $Y_S$, $Y_H$, and γ as follows:

$$\alpha = \left(\frac{Y_S}{Y_H}\right)^{1/\gamma}$$

In this situations, when the value of scaling factor α is found that relates $Y_S$ and $Y_H$, the scaling factor α can also be used to find SDR Cb and Cr values from HDR Cb and Cr values, as:

$$Cb_s = F_{Cb_s}\left(\alpha \cdot \begin{bmatrix} R_{CH} \\ G_{CH} \\ B_{CH} \end{bmatrix}\right) =$$

$$\alpha^\gamma \cdot (a_{C_{b}r} \cdot R_{CH}^\gamma + a_{C_{b}g} \cdot G_{CH}^\gamma + a_{C_{b}r} \cdot B_{CH}^\gamma) = \alpha^\gamma \cdot Cb_H$$

$$Cr_s = F_{Cr_s}\left(\alpha \cdot \begin{bmatrix} R_{CH} \\ G_{CH} \\ B_{CH} \end{bmatrix}\right) =$$

$$\alpha^\gamma \cdot (a_{C_{r}r} \cdot R_{CH}^\gamma + a_{crg} \cdot G_{CH}^\gamma + a_{C_{r}r} \cdot B_{CH}^\gamma) = \alpha^\gamma \cdot Cr_H$$

As such, when the ratio of $Y_S$ to $Y_H$ can be determined by an encoder 100 or decoder 102 in the situation in which the encoder's color conversion operations 208 include a transfer function that is a power function where $C'=C^\gamma$, the encoder 100 or decoder 102 can convert between an SDR Cb value $Cb_S$ and an HDR Cb value $Cr_S$, and between an SDR Cr value $Cr_S$ and an HDR Cr value $Cr_H$ using the following formulas:

$$Cb_s = \left(\frac{Y_S}{Y_H}\right) \cdot Cb_H$$

$$Cr_s = \left(\frac{Y_S}{Y_H}\right) \cdot Cr_H$$

As described above, metadata items 108 describing attributes of a color volume transform operation 210 and/or inverse color volume transform operation 406, such as parameters of a tone mapping function, a scaling factor, a 3D LUT, or a set of three 1D LUTs can be generated by the encoder 100, such that a decoder 102 can use the indicated inverse color volume transform operation 406 to convert SDR values decoded from a bitstream 106 into HDR values for display.

Figure 6:
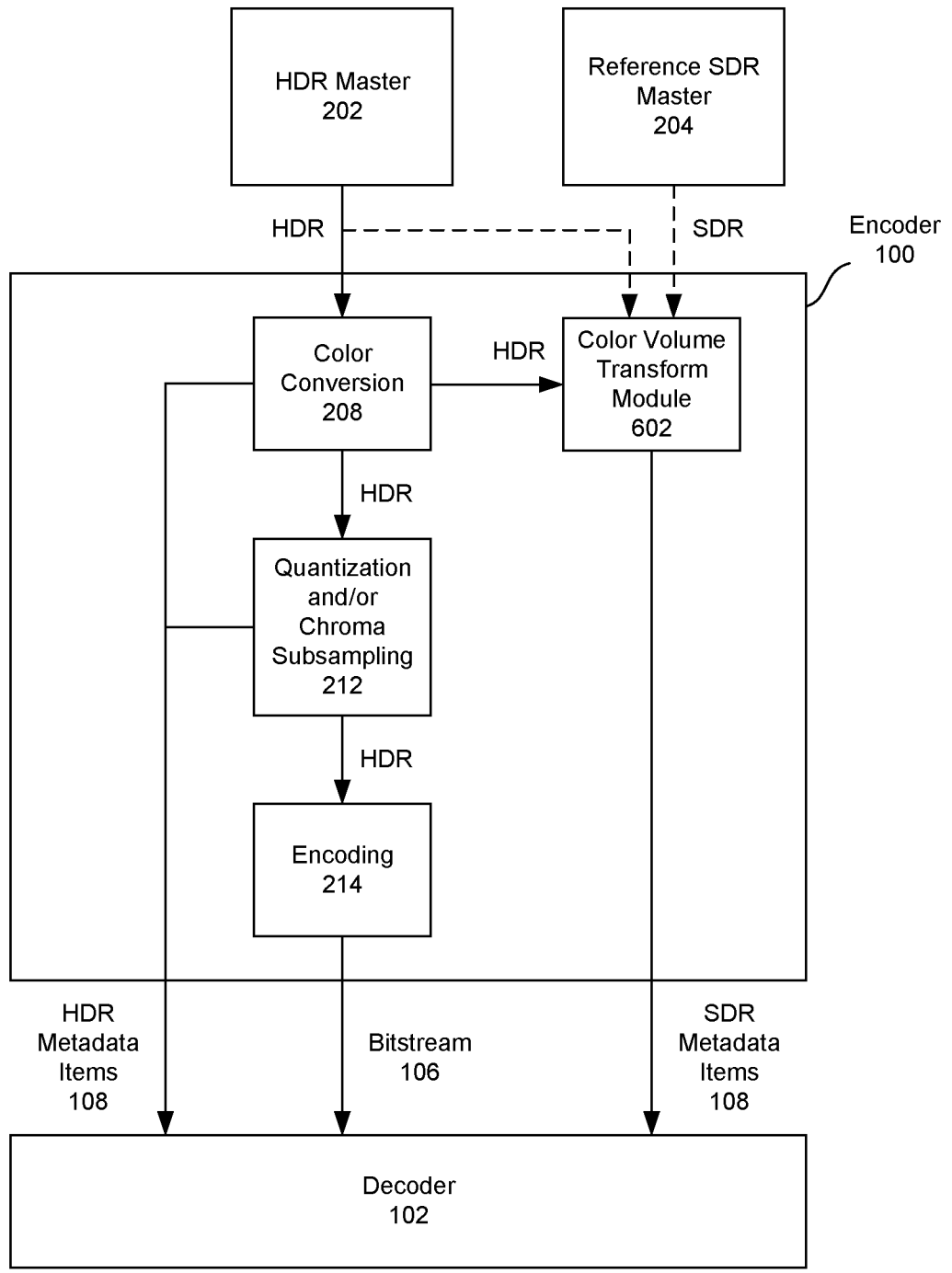
FIG. 6 depicts an embodiment of an encoder configured to generate a bitstream with encoded HDR values from an HDR Master.
Figure 7:
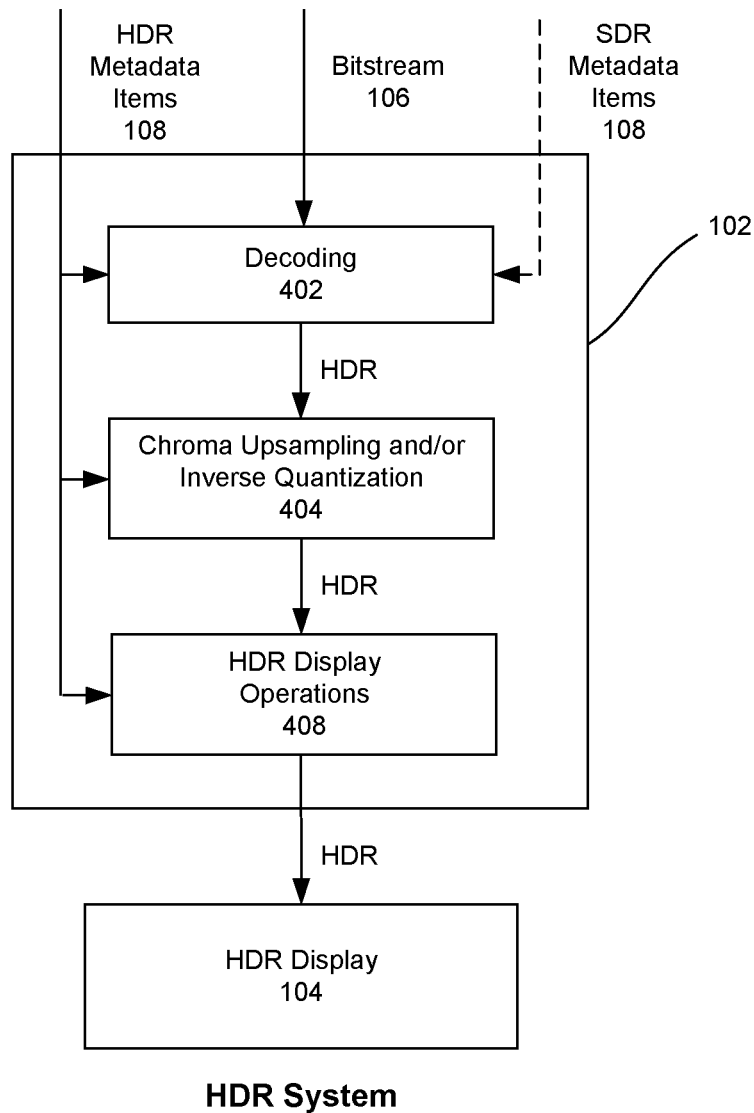
FIG. 7 depicts an embodiment a decoder in an HDR System configured to decode and display HDR values from the bitstream produced by the encoder shown in FIG. 6.
Figure 8:
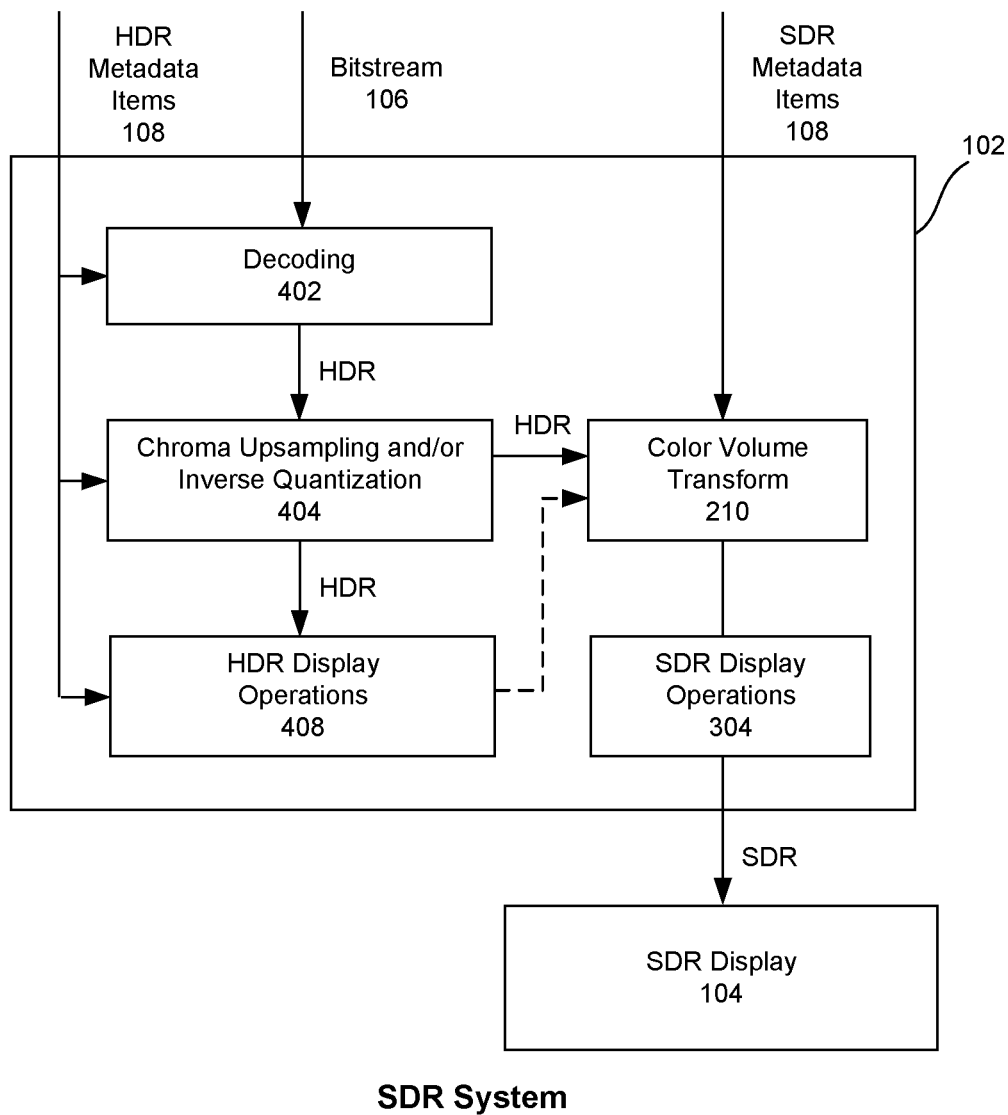
FIG. 8 depicts an embodiment a decoder in an SDR System configured to decode HDR values from the bitstream produced by the encoder shown in FIG. 6, and to convert the HDR values into SDR values for display.

In alternate embodiments, the encoder 100 can encode HDR values into the bitstream 106, but provide metadata items 108 indicating to a decoder 102 how to convert decoded HDR values into SDR values for display. As such, in some embodiments metadata items 108 such as parameters of a tone mapping function, a scaling factor, a 3D LUT, or a set of three 1D LUTs can be communicated from an encoder 100 to a decoder 102 for an SDR System, such that the decoder 102 can use the color volume transform operation 210 indicated by the metadata items 108 to convert decoded HDR values into SDR values for display. FIGS. 6-8 depict an example of such an alternate embodiment.

FIGS. 6-8 depict an alternate embodiment of system in which an encoder 100 can generate a bitstream 106 from HDR values such that the bitstream 106 can be decoded by both HDR Systems and SDR Systems depending on their display properties. As shown in FIG. 6, in this embodiment the encoder 100 can output a bitstream 106 that comprises encoded versions of HDR luminance and/or chromaticity values, one or more HDR metadata items 108 indicating how the encoder 100 encoded the HDR values from the original HDR values, and one or more SDR metadata items 108 indicating how an SDR system's decoder 102 can convert decoded HDR values into SDR values that substantially match SDR values from a Reference SDR Master 204. As such, an HDR System can reconstruct an HDR video from the bitstream 106 for playback as shown in FIG. 7, while an SDR System can decode the bitstream 106 and use an operation identified in one or more SDR metadata items 108 to convert decoded HDR values into SDR values for playback on an SDR display 104 as shown in FIG. 8.

While FIGS. 7 and 8 depict separate decoders 102 for HDR Systems and SDR Systems, in alternate embodiments a decoder 102 can be configured with operations for both HDR Systems and SDR Systems, such that the same decoder 102 can follow the operations shown in FIG. 7 if it is outputting video to an HDR display 104 or the operations shown in FIG. 8 if it is outputting video to an SDR display 104.

The encoder 100 shown in the embodiment of FIG. 6 can receive both an HDR Master 202 and a Reference SDR Master 204 of the same video. The encoder 100 can perform one or more color conversion operations 208 on HDR values from the HDR Master 202, such as converting HDR RGB values into HDR YCbCr values, as described above with respect to FIG. 2. The encoder can further perform one or more quantization and/or chroma subsampling operations 212 on the HDR values, before encoding the HDR values into a bitstream at 214. In this embodiment, the quantization and/or chroma subsampling operations 212 can serve to decrease the number of bits that will be encoded to describe the HDR values. The encoder can also generate HDR metadata items 108 that indicate how the color conversion operations 208, quantization and/or chroma subsampling operations 212, and encoding 214 was performed on the HDR values.

In addition to encoding the HDR values into the bitstream 106 as described above, the encoder 100 can also pass original HDR values and/or HDR values converted by color conversion operations 208 into another color space to a color volume transform module 602. The color volume transform module 602 can also receive SDR values from the Reference SDR Master 204.

The color volume transform module 602 can use the input HDR values and reference SDR values using the formulas and processes described above to find parameters of a parametric tone mapping operation, a scaling factor, a 3D LUT, or a set of three 1D LUTs that a decoder 102 can use to convert the HDR values into SDR values that, when the SDR values are converted for display on an SDR display, will substantially match the reference SDR values. The color volume transform module 602 can output one or more SDR metadata items 108 that indicate how values in an HDR color volume can be converted into corresponding values in an SDR color volume.

In this embodiment, the bitstream 106 comprising HDR values, the HDR metadata items 108, and the SDR metadata items 108 can be delivered to decoders for HDR Systems and SDR Systems.

FIG. 7 depicts a decoder 102 in an HDR System decoding the bitstream 106 generated by the encoder shown in FIG. 6. A decoder 102 for an HDR System can receive the bitstream 106 and metadata items 108. The decoder 102 can ignore the SDR metadata items 108 that describe how to convert values from an HDR color volume to values in an SDR color volume. The decoder 102 can decode the bitstream 106 to find HDR values, and then perform any inverse quantization and/or chroma upsampling operations 404 indicated by HDR metadata items 108.

The decoder 102 and/or display 104 can also perform one or more HDR display operations 408 on the decoded HDR values to convert them for presentation on the display 104. Additionally, when the decoded HDR values are in a different color space than can be presented by the HDR display 104, the decoder 102 or display 104 can perform one or more HDR display color space conversion operations that convert the HDR values into the desired color space. By way of a non-limiting example, when decoded values are HDR YCbCr values and the HDR display 104 is configured to present HDR RGB values, the decoder 102 can use HDR display color space conversion operations to convert the HDR YCbCr values into HDR RGB values that can be displayed by the HDR display 104. In alternate embodiments, the HDR display 104 can perform HDR display color space conversion operations on values decoded by the decoder 102 to convert them into a color space that the HDR display 104 can reproduce.

Once the decoded HDR values are in the color space used by the HDR display 104, the HDR display 104 can present a reconstruction of the video's image essence using the HDR values.

FIG. 8 depicts a decoder 102 in an SDR System decoding the bitstream 106 generated by the encoder shown in FIG. 6. A decoder 102 for an SDR System can receive the bitstream 106 and metadata items 108. A decoder 102 for an HDR System can receive the bitstream 106 and metadata items 108. The decoder 102 can decode the bitstream 106 to find HDR values at 402, and then perform any inverse quantization and/or chroma upsampling operations 404, and/or HDR display operations 408 indicated by HDR metadata items 108.

In addition, the decoder 102 for an SDR System shown in FIG. 8 can perform a color volume transform operation 210 to convert decoded HDR values into SDR values. The decoder 102 can receive SDR metadata items 108 produced by the encoder's color volume transform module 602 that indicate how values in an HDR color volume can be converted to an SDR color volume, such that final display SDR values will substantially match reference SDR values from the SDR Master 204. The decoder 102 can perform the color volume transform operation 210 indicated by the SDR metadata items 108 to convert HDR values that were decoded from the bitstream 106 into SDR values. By way of a non-limiting example, the decoder 102 can convert decoded HDR YCbCr values into SDR YCbCr values.

The decoder 102 and/or display 104 can also perform one or more SDR display operations 304 on the decoded SDR values to convert them for presentation on the display 104. Additionally, when the SDR values are in a different color space than can be presented by the SDR display 104, SDR display operations 304 performed by the decoder 102 or display 104 can be SDR display color space conversion operations that convert the SDR values into the desired color space. By way of a non-limiting example, when values are SDR YCbCr values and the SDR display 104 is configured to present SDR RGB values, the decoder 102 can use SDR display color space conversion operations to convert the SDR YCbCr values into SDR RGB values that can be displayed by the SDR display 104. In alternate embodiments, the SDR display 104 can perform SDR display color space conversion operations on SDR values output by the decoder 102 to convert them into a color space that the SDR display 104 can reproduce.

Once the SDR values are in the color space used by the SDR display 104, the SDR display 104 can present a reconstruction of the video's image essence using the SDR values.

As shown in FIGS. 2 and 6, an encoder 100 can produce a bitstream 106 from an HDR Master 202 that, when decoded and presented by an SDR System can substantially match the Reference SDR Master 204 and allow viewers to perceive colors as intended for SDR Systems. In some embodiments the encoder 100 can perform a color volume transform operation 210 to convert HDR values into SDR values before encoding the bitstream, and decoders 102 for HDR Systems can perform an inverse color volume transform operation 406 to convert decoded SDR values into HDR values for display, as shown in FIGS. 2-4. In other embodiments an encoder 100 can identify a color volume transform operation 210 at a color volume transform module 602 and indicate that color volume transform operation 210 to decoders 102 for SDR Systems in metadata items 108, such that decoders 102 for SDR Systems can decode HDR values from a bitstream 106 and then convert them into SDR values using the color volume transform operation 210, as shown in FIGS. 6-8.

Converting values between an HDR color volume and an SDR color volume using the methods described above can also assist in quantization and/or compression of the SDR values. By way of a non-limiting example, SDR values such as SDR Cb or Cr components can be scaled to stretch their dynamic range as HDR values, such that larger quantization step sizes can be used to achieve the same distortion when the components are unscaled back to SDR values.

Although the present invention has been described above with particularity, this was merely to teach one of ordinary skill in the art how to make and use the invention. Many additional modifications will fall within the scope of the invention, as that scope is defined by the following claims.

The invention claimed is:

1. A method of encoding a digital video, comprising:
(a) an encoder receiving a high dynamic range (HDR) master, a standard dynamic range (SDR) master, and a target SDR display properties indicating SDR display characteristics used to convert decoded SDR values for being displayed, wherein said HDR master is a first image essence of a video comprising HDR values in a HDR color volume, and said SDR master is a second image essence of said video comprising SDR values in a SDR color volume;
(b) finding a color volume transform at said encoder such that said color volume transform transforms HDR values originating from said HDR master into SDR values that are substantially similar to said SDR values that are further based upon color profile characteristics of said target SDR display properties;
(c) said encoder generating at least one metadata item that identifies at least one characteristic of said color volume transform to a decoder; and
(d) encoding said SDR values generated based upon said color volume transform into a bitstream with said encoder together with said at least one metadata item.

2. The method of claim 1, further comprising:
receiving said target SDR display properties at said encoder, said target SDR display properties indicating SDR display operations that a target SDR display uses to convert decoded SDR values for display on a screen for use in the conversion of HDR values originating from said HDR master into the generated SDR values that are substantially similar to said SDR values;
converting the HDR values originating from said HDR master into the generated SDR values using said color volume transform at said encoder.

3. The method of claim 1, further comprising converting said HDR values from said HDR master into a different color space prior to performing said color volume transform.

4. The method of claim 1, wherein said HDR values from said HDR master are HDR RGB values, said encoder converts said HDR RGB values into HDR YCbCr values, said encoder converts said HDR YCbCr values into SDR YCbCr values using said color volume transform, and said encoder encodes said SDR YCbCr values into said bitstream.

5. The method of claim 1, further comprising:
receiving said bitstream and said at least one metadata item at a decoder for an HDR system;
decoding said bitstream into decoded SDR values with said decoder;
finding an inverse color volume transform at said decoder based on said at least one metadata item; and
converting said decoded SDR values into decoded HDR values using said inverse color volume transform at said decoder.

6. The method of claim 1, wherein said encoder finds said color volume transform by finding an operation that minimizes a distance between said SDR values and SDR values produced by the operation once they are converted for display at an SDR display.

7. The method of claim 1, wherein said encoder finds said color volume transform by finding display HDR values by performing a color space conversion on the HDR values originating from said HDR master; linearly scaling said display HDR values by a scaling factor; and finding an operation that minimizes a distance between the scaled display HDR values and SDR values produced by the operation once they are converted for display at an SDR display.

8. The method of claim 1, wherein said encoder finds said color volume transform by finding a scaling factor that leads to a minimum distance between a luma value generated from said HDR values scaled by said scaling factor, and an SDR luma value generated by said color volume transform.

9. The method of claim 8, wherein said encoder generates SDR chroma components from said HDR values scaled by said scaling factor after said scaling factor has been found.

10. The method of claim 1, wherein said encoder performs a power function on said HDR values prior to performing said color volume transform, and said encoder finds said color volume transform by finding a scaling factor based on a ratio of an SDR luma component generated by said color volume transform against an HDR luma component derived from said HDR values taken to the inverse of the power used in said power function.

11. The method of claim 10, wherein said encoder generates SDR chroma components by multiplying HDR chroma components by the ratio of the SDR luma component to the HDR luma component.

12. The method of claim 1, wherein said color volume transform is an invertible parameterized tone mapping function, and said at least one metadata item indicates a parameter for adjusting said tone mapping function.

13. The method of claim 1, wherein at least one metadata item indicates a scaling factor used by said color volume transform to convert values between the SDR color volume and the HDR color volume.

14. The method of claim 1, wherein at least one metadata item indicates a reversible three dimensional lookup table that maps a ternary set of values in the SDR color volume to another ternary set of values in the HDR color volume.

15. The method of claim 1, wherein at least one metadata item indicates a set of three one-dimensional lookup tables, each of which maps one of a ternary set of values in the SDR color volume to a corresponding one of a ternary set of values in the HDR color volume.

16. The method of claim 1, further comprising:
receiving said bitstream and said at least one metadata item at a decoder for an SDR system;
decoding said bitstream into decoded HDR values with said decoder;
identifying said color volume transform at said decoder based on said at least one metadata item; and
converting said decoded HDR values into decoded SDR values using said color volume transform at said decoder.

17. The method of claim 16, wherein said color volume transform is an invertible parameterized tone mapping function, and said at least one metadata item indicates a parameter for adjusting said tone mapping function.

18. The method of claim 16, wherein at least one metadata item indicates a scaling factor used by said color volume transform to convert values between the SDR color volume and the HDR color volume.

19. The method of claim 16, wherein at least one metadata item indicates a reversible three dimensional lookup table that maps a ternary set of values in the SDR color volume to another ternary set of values in the HDR color volume.

20. The method of claim 16, wherein at least one metadata item indicates a set of three one-dimensional lookup tables, each of which maps one of a ternary set of values in the SDR color volume to a corresponding one of a ternary set of values in the HDR color volume.

* * * * *